June 6, 1967  E. D. CONNER  3,323,599
ROTARY MECHANICAL CULTIVATOR
Filed Jan. 25, 1965  5 Sheets-Sheet 1
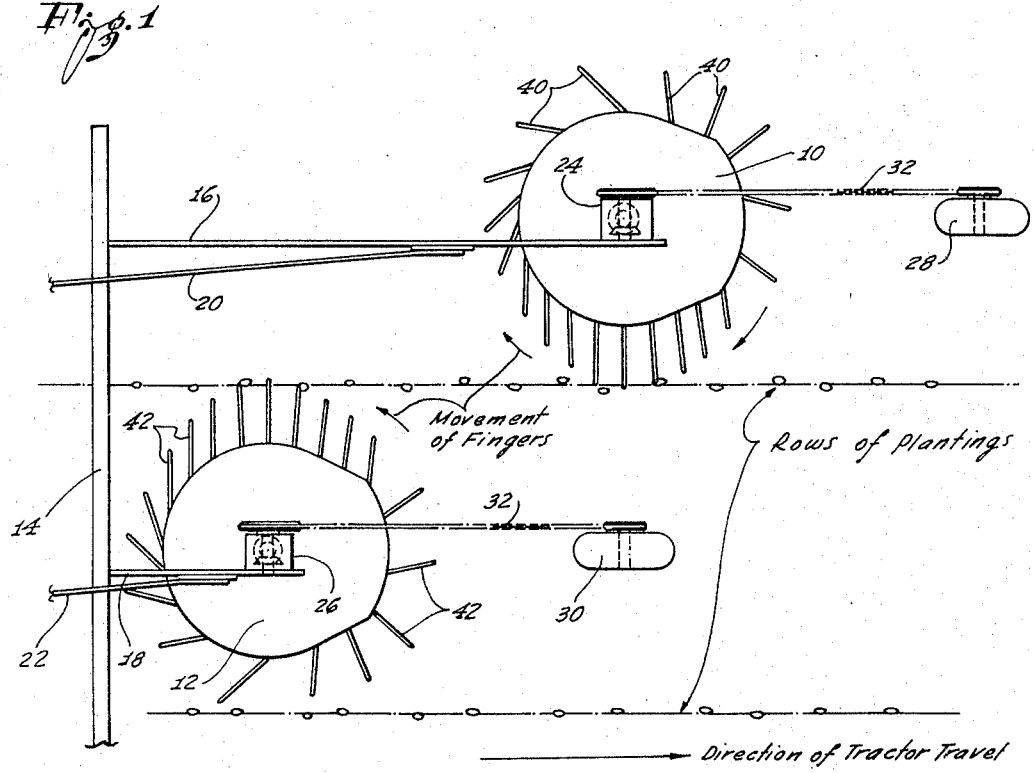
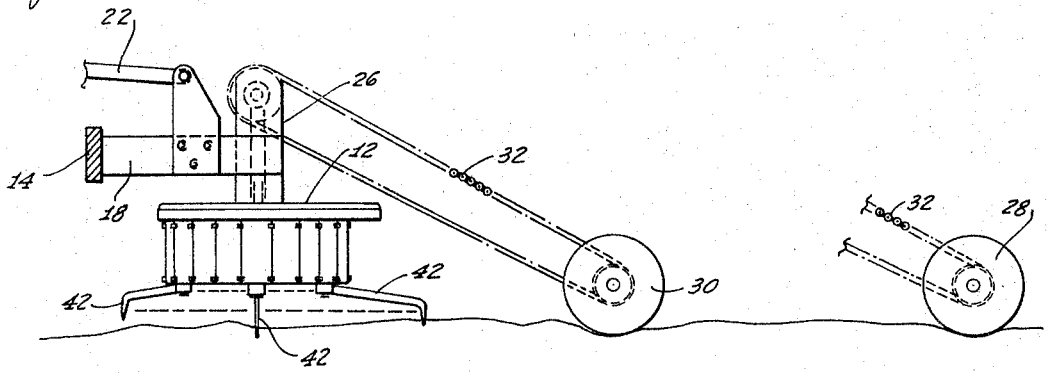
INVENTOR:
Edward D. Conner
By Keith D. Beecher
Attorney

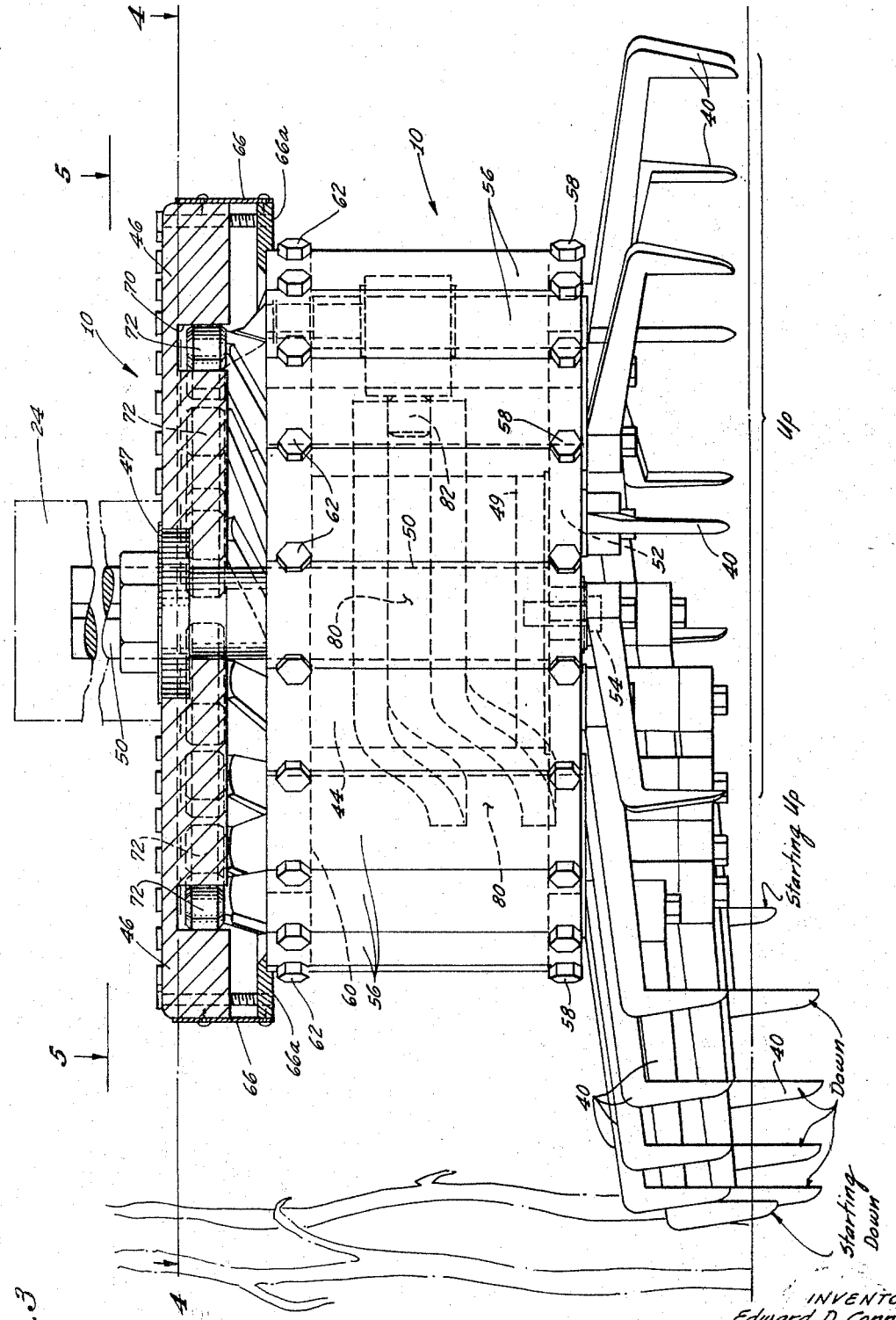

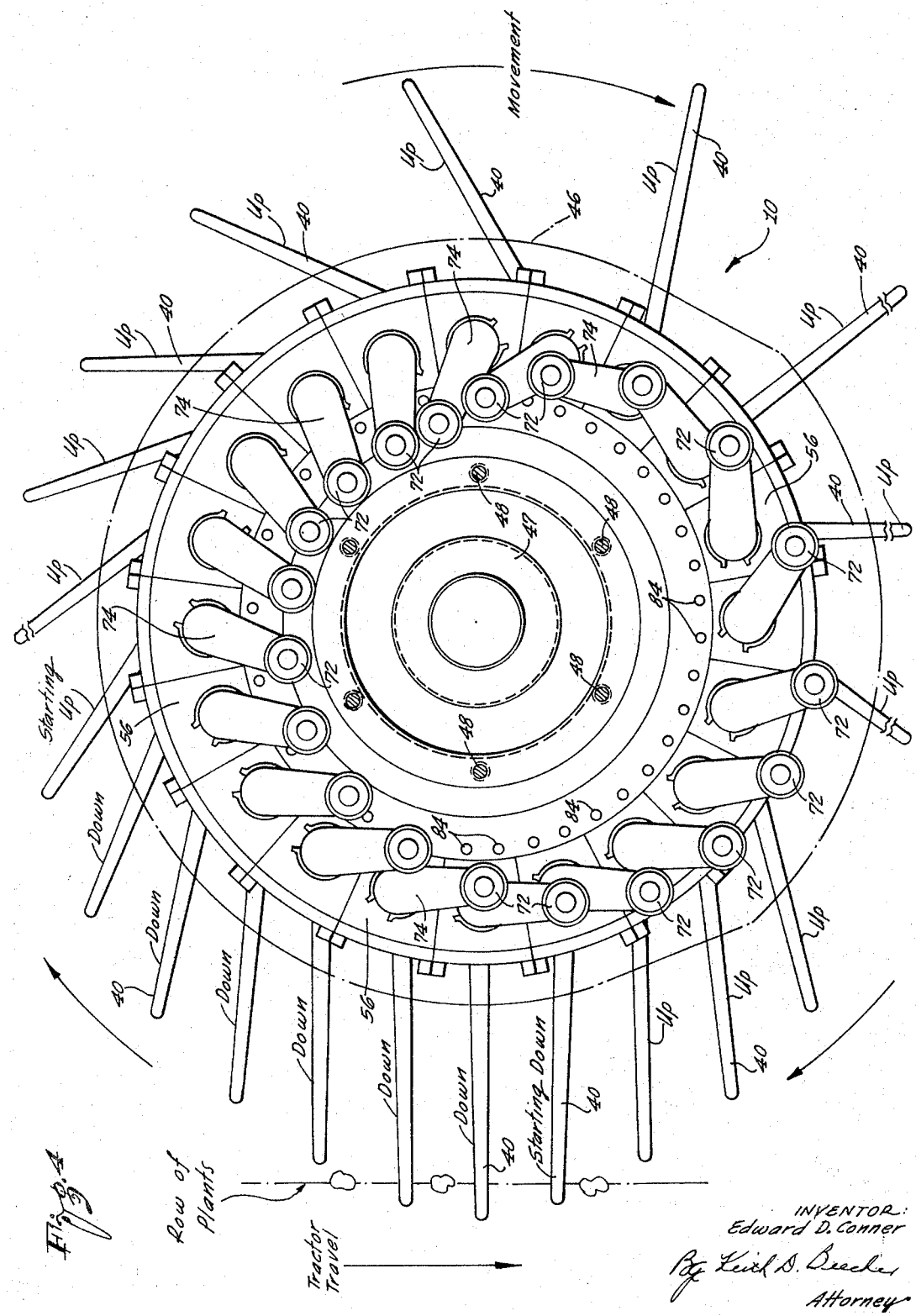

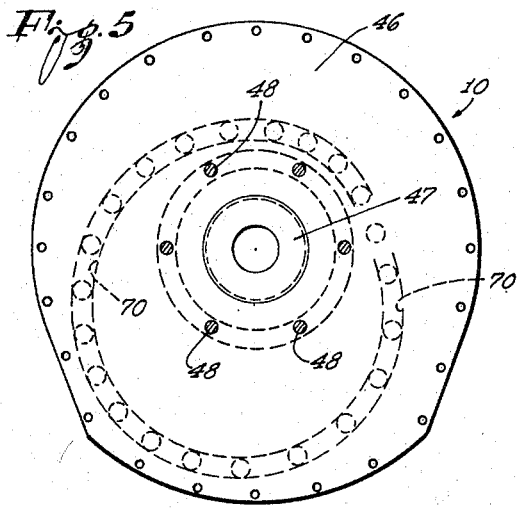
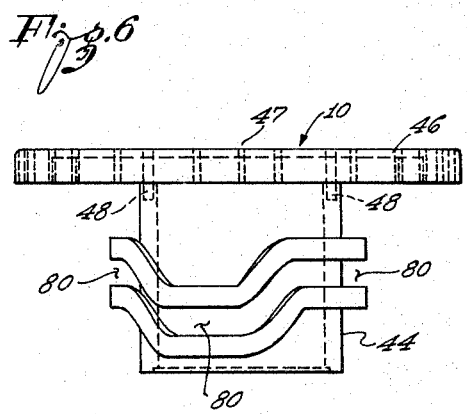
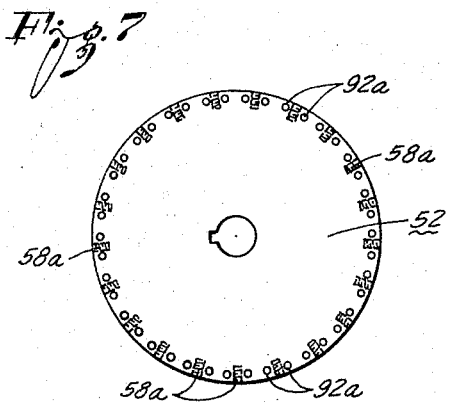
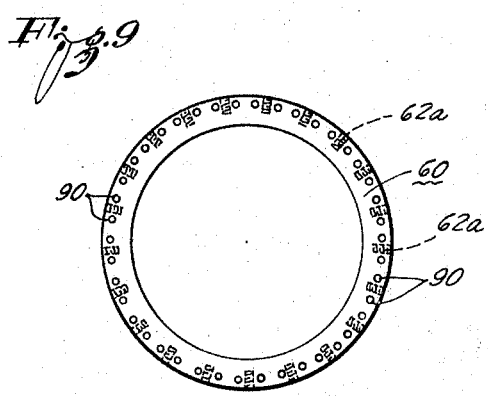
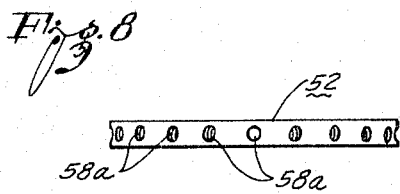
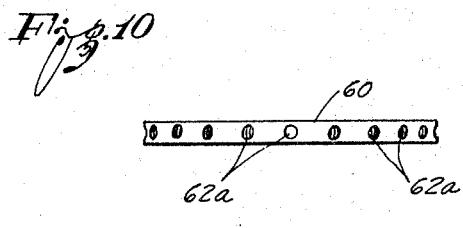
INVENTOR:
Edward D. Conner

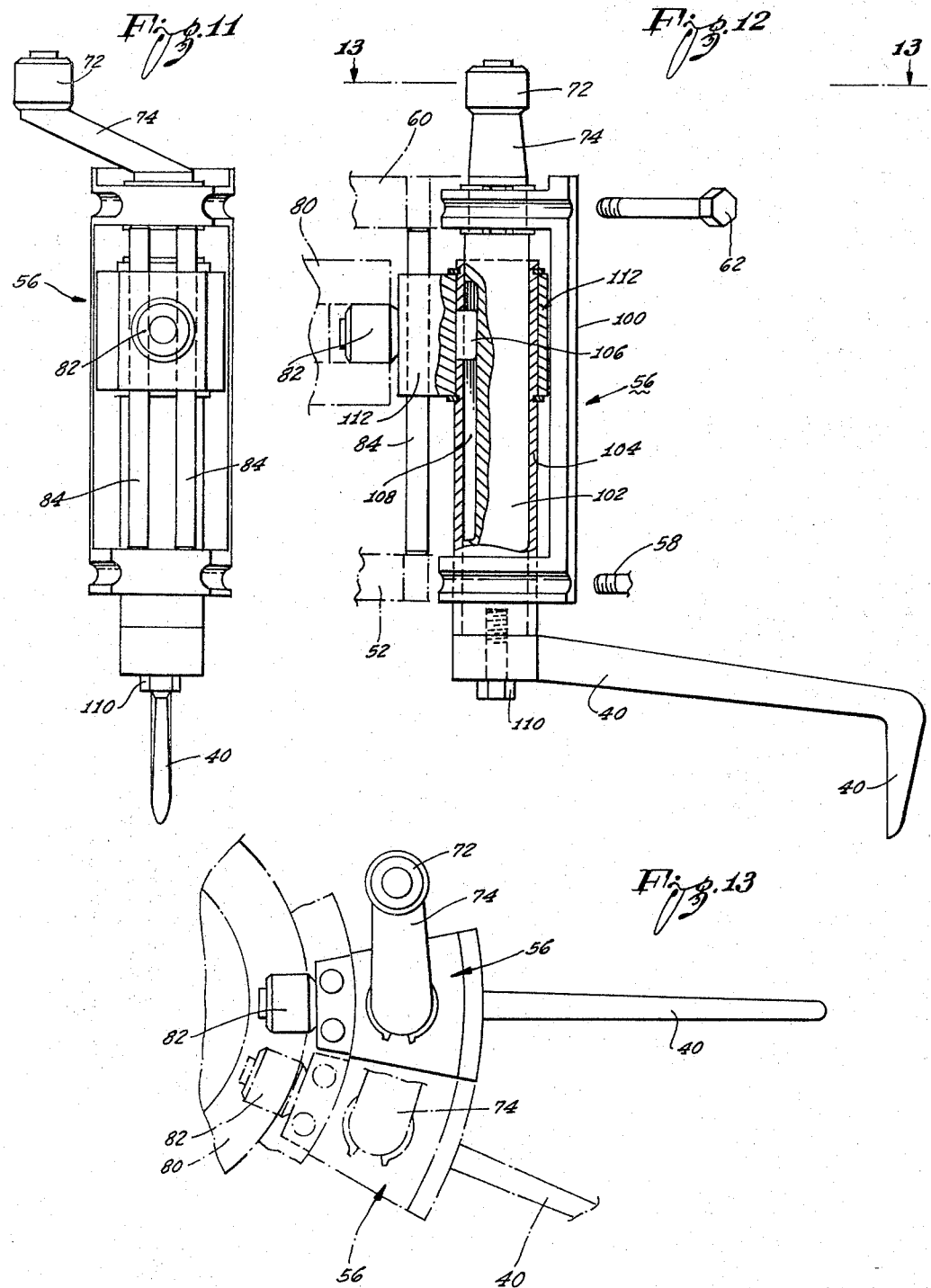

United States Patent Office 3,323,599
Patented June 6, 1967

3,323,599
ROTARY MECHANICAL CULTIVATOR
Edward D. Conner, 2700 Peterson Way, Apt. 9–A,
Costa Mesa, Calif. 92626
Filed Jan. 25, 1965, Ser. No. 427,770
6 Claims. (Cl. 172—94)

The present invention relates to agricultural implements for use in destroying weeds and loosening the soil around a growing crop, such as cotton; and it relates more particularly to an improved cultivator which is relatively simple to operate and which performs its desired function with a high degree of efficiency.

The improved cultivator to be described may, for example, be drawn by a tractor, or other means. The cultivator comprises either one horizontal head adapted to be drawn down one side of a row of growing crops; or it may comprise a pair of such horizontal heads positioned to be drawn down opposite sides of the row.

A plurality of movable fingers are mounted on each head, and these fingers are cam-operated in a manner to be described. The control is such that as the cultivator is drawn or driven down the row, the fingers of each of the cultivator heads rotate about respective vertical axes and enter and leave the row at right angles to the line of travel of the cultivator and at right angles to the row itself. Moreover, each finger enters and leaves the row without any appreciable sidewise motion.

Each of the aforesaid fingers has a hoe-like configuration, and each is moved down into the soil after it has entered the row and prior to its being withdrawn from the row.

When the cultivator of the invention is used in the cultivation of cotton, for example, or other crops with relatively sturdy stalks, should a finger contact the stalk upon its entering the row, it is deflected so as to pass to one side of the stalk. Then, the subsequent downward movement of the finger into the soil, and the withdrawal of the finger draws weeds and the like out of the row and deposits them between adjacent rows.

As mentioned, the actuation of the fingers associated with each of the cultivator heads is such that as the cultivator is drawn or driven down a row of crops, each finger enters the row and leaves the row along a path perpendicular to the row and without any appreciable sidewise motion. Moreover, as each finger enters the row, it is cam actuated to move down into the turf; so that when it is withdrawn, it draws weeds, and the like, out from the row and also serves to pulverize the earth around the crops.

An object of the invention, therefore, is to provide an improved mechanism for cultivating crops, which mechanism is capable of rapidly and efficiently removing weeds from a row of crops or plantings, and loosening the soil around the crops, without in any way interfering with or damaging the crops themselves.

Another object of the invention is to provide such an improved cultivator which may be effectively operated without damage to crops by relatively unskilled operators.

A still further object of the invention is to provide such an improved cultivator which is relatively simple and inexpensive in its construction, and which may be sold at a relatively low price.

Other objects and advantages of the invention will become apparent from a consideration of the following description, when the description is taken in conjunction with the accompanying drawings, in which:

FIGURE 1 is a schematic plan view, showing an embodiment of the cultivator of the invention in operation;

FIGURE 2 is a schematic elevational view illustrating particularly one of the cultivator heads, and the means for mounting and driving the heads;

FIGURE 3 is an elevational view, partly in section, of one of the cultivator heads, on an enlarged scale, with respect to FIGURE 1;

FIGURE 4 is a view of the head of FIGURE 3, taken substantially along the line 4—4 of FIGURE 3;

FIGURE 5 is a top view of the head of FIGURE 3, on a reduced scale and taken substantially on the line 5—5 of FIGURE 3;

FIGURE 6 is an elevational view of a stationary hub, also on a reduced scale, forming a portion of the assembly of FIGURE 3;

FIGURE 7 is a bottom view of a bottom plate included in the assembly of FIGURE 3, also on a reduced scale;

FIGURE 8 is a side elevational view of the bottom plate of FIGURE 7, also on a reduced scale;

FIGURE 9 is a plan view of a top ring, forming a portion of the assembly of FIGURE 3, also on a reduced scale;

FIGURE 10 is a side elevational view of the ring of FIGURE 9, also on a reduced scale;

FIGURE 11 is an elevational view of a finger assembly, a plurality of which are included in the overall assembly of FIGURE 3;

FIGURE 12 is another elevational view, partly in section, of the assembly of FIGURE 11; and FIGURE 13 is a plan view, substantially along the line 13—13 of FIGURE 12, of the finger assembly.

The cultivator shown in FIGURE 1 includes a pair of horizontal cultivator heads 10 and 12. These cultivator heads include fingers which, as will be described, rotate about respective vertical axes, as the cultivator is drawn or driven down a row of plantings, or crops, as shown. The mechanism of FIGURE 1 is such that one of the cultivator heads is moved on one side of the row of plantings which is to be cultivated, and the other head is drawn along the other side.

The heads 10 and 12 may be drawn from the left to the right in FIGURE 1 by any suitable mechanism (not shown) such as a tractor. The assembly is mounted on a transverse horizontal frame beam 14, for example, by means of a pair of frame beams 16 and 18. The frame beam 14 is mounted on a tractor, or other vehicle. Suitable linkages 20 and 22 are respectively coupled to the beams 16 and 18, and may be actuated in any known manner by the tractor mechanism, so as to control the elevation of the heads 10 and 12, and also to draw the heads upwardly to an inoperative position.

Each of the heads 10 and 12 includes a stationary hub, as will be described, and these hubs are secured to the ends of the beams 16 and 20 respectively, by suitable mounts, such as the mounts 24 and 26.

The heads 10 and 12 are controlled, for example, by respective gauge wheels 28 and 30. The gauge wheels are coupled through appropriate couplings, such as a chain drive 32, shown in FIGURE 2, and through appropriate gears, to the drive shaft of the respective heads 10 and 12. Then, as the mechanisms are moved along the side of the row, the cultivator heads are rotatably driven, so that a plurality of fingers, such as the fingers 40 associated with the cultivator head 10, and the fingers 42 associated with the cuIivator head 12, are caused to move around the respective heads 10 and 12.

The fingers 40 and 42 have a hoe-like configuration, as best shown in FIGURE 2. And these fingers are controlled, so that as the cultivator is moved, for example, to the right in FIGURE 1, the fingers 40 of the head 10 are rotated about the head in a clockwise direction, and the fingers 42 of the head 12 are rotated about the latter head in a counterclockwise direction.

Moreover, the fingers 40 and 42 are caused to move outwardly to a radial position, as shown in FIGURE 1, as they become positioned adjacent the row of crops to be cultivated. Then, the fingers are caused to be moved in between the adjacent stalks and then to be moved down into the soil. Then, as each finger is withdrawn from the row, it performs a soil pulverizing, weeding and cultivating action.

The fingers 40 and 42 are shaped so that the stalks of the crops themselves, such as cotton, for example, are moved to one side, as the fingers are moved into the row, and the fingers also may be loosely mounted, as mentioned, to move to one side; so that only weeds are withdrawn by the fingers, when they are subsequently moved down into the soil and withdrawn.

As will be described, the time relation between the rotation of the fingers 40 and 42 about the individual cultivator heads 10 and 12 and the forward motion of the cultivator itself, is such that as the fingers turn about the respective cultivator heads in FIGURE 1, the individual fingers enter and leave the row of plantings without any sidewise movement. This "in and out" movement of the individual fingers, as mentioned above, is accompanied by a downward movement thereof, so that they may properly perform their soil pulverizing, weeding and cultivating function.

The heads 10 and 12 may be constructed in the same manner, and for that reason, the actual structural details of the head 10 only will be described herein.

As shown in FIGURES 3 and 6, the head 10 includes a stationary central hub 44 and an associated stationary cover 46. The hub 44 may be secured to the cover 46 by appropriate screws, such as the screws 48. The cover 46 is secured, for example, to the mount 24, so that it is supported in a stationary manner on the beam 16.

The cover 46 is also shown in FIGURE 5, and as shown therein, the assembly includes a top bearing 47. A lower bearing 49 (FIGURE 3) is also mounted in the stationary hub, and a drive shaft 50 is rotatably mounted in the bearings 47 and 49, the drive shaft being shown in FIGURE 3. The drive shaft 50 extends into the mount 24, to be rotatably driven, for example, by the gauge wheel 28 of FIGURE 1. Suitable thrust bearings (not shown) may be incorporated in the assembly.

A bottom plate 52 (FIGURES 8 and 9) is keyed to the lower end of the drive shaft 50, and is held in place, for example, by a bolt 54. A plurality of finger assemblies 56 are bolted to the bottom plate 52 by means, for example, of individual bolts 58. These assemblies 56 are also bolted to a top ring 60 (see also FIGURES 9 and 10) by means, for example, of individual bolts 62. These components, of course, may be formed into an integral hub, if so desired.

Therefore, as the rotatable cultivator head 10 is driven, the individual finger assemblies 56, together with the bottom plate 52 and top ring 60, are caused to rotate about the central axis of the stationary hub 44. As shown in FIGURE 3, for example, an appropriate dust shield 66 may be mounted on the cover 46, the dust shield including a resilient annular portion 66a which engages the rotating top edges of the finger assemblies 56.

The underside of the cover 46 defines a closed cam loop or track 70 (FIGURES 3 and 5). The individual finger assemblies 56 include rotatably mounted cam followers 72. These rotatable cam followers are mounted on the ends of corresponding arms 74. The cam followers 72 ride in the closed cam loop 70 on the underside of the cover 46 as the finger assemblies 56 are rotated about the central axis of the hub. The cam loop 70 causes the cam follower 72 to produce selective rotational movements of the individual finger assemblies 56. These movements are such that the fingers 40 are moved out to a radial position, as shown, for example, in FIGURES 1 and 4, as they approach the row of crops.

The combined actions of the cam follower 72, together with the rotation of the cultivator head 10, and the forward motion of the cultivator itself, are such that each of the fingers 42, as shown in FIGURES 1 and 4, is moved into the row of crops between adjacent stalks, and is subsequently withdrawn from the row, this action of the individual fingers being along an axis essentially perpendicular to the row and without any sidewise movement of the individual fingers.

The stationary hub 44, as best shown in FIGURES 3 and 6, also includes a further cam loop or track 80 which extends around the hub. Each of the finger assemblies 56 also includes a cam follower 82 which rides in the cam loop 80. The cam followers 82, as they ride in the cam loop 80, move down, when the fingers are moved out to their radial position, and after the individual fingers have been moved into the row of crops. This downward movement of the individual fingers causes them to move down into the soil prior to their being withdrawn from the row, so as to accomplish properly their cultivating function.

The "up and down" movement of the finger assemblies 56 is carried out between guide pins 84 (see FIGURES 11-13) which extend into the top ring 60 and into the bottom plate 52. The guide pins 84 are supported in apertures 90 in the top ring 60 (FIGURE 9) and in apertures 92 (FIGURE 7) in the bottom plate. The bolts 58 are received in threaded radial apertures 58a in the lower plate (FIGURES 7 and 8); and the bolts 62 are received in threaded apertures 62a (FIGURES 9 and 10) in the top ring.

As shown in FIGURES 11, 12 and 13, each of the finger assemblies 56 includes, for example, a support bracket 100 which is bolted into the bottom plate 52 and into the top ring 60 by means of the aforesaid bolts 62 and 58. A central shaft 102 is rotatably mounted in the bracket 100, and this shaft is integral with the crank 74, so that as the cam follower 72 rides in the aforesaid looped cam 70, the individual shafts 102 are caused to rotate in the brackets 100.

The shaft 102 has a sleeve 104 mounted coaxially therewith. A key 106 is formed in the sleeve 104, and this key rides in a key way 108 in the shaft 102. The finger 40 is attached to the lower end of the sleeve 104 by means, for example, of a bolt 110. The sleeve rotates as the shaft 102 is rotated, by virtue of the coupling between the key 106 and the key way 108. However, the sleeve 104 may also slide up and down on the shaft 102, so that the finger 40 may be moved downwardly and upwardly, under the action of the cam follower 82. For this purpose, the cam follower is rotatably mounted on a carriage 112 which is attached to the sleeve 104. The member 112 is held against rotational movement, by means of the aforesaid guide pins 84. Therefore, as the cam follower 82 rides in the closed looped cam 80, the carriage 112 moves up and down, and carries the sleeve 104 with it.

Therefore, as the cultivator head 10 is rotatably driven, the finger assemblies 56 are moved about the central axis of the stationary hub. This rotational movement of the finger assemblies causes the fingers to move radially and vertically in the manner described above, so that the mechanism may properly perform its cultivating function.

The invention provides, therefore, an improved cultivator which may be moved down a row of crops, and which functions in the described manner to remove weeds from around the stalks of the crops and to pulverize the soil. The action of each of the rotatable cultivator heads of the cultivator is such that each hoe-like finger of each such head moves in and out of the row of crops without any sidewise movement, so that proper cultivating may be carried out by relatively unskilled operators without any likelihood of damage to the crops. That is, even though the cultivator may be moved slightly from the proper line of travel, it is still constrained properly to perform its culivating function.

It will be appreciated that although a particular embodiment of the invention has been shown and described,

What is claimed is:

1. A mechanism for cultivating a row of crops, including: at least one head having a stationary portion and further having a rotatable member mounted on said stationary portion for rotation relative to said stationary portion about an essentially vertical axis; drive means coupled to said head for producing rotation of said rotatable member about said vertical axis when the mechanism is moved; a plurality of hoe-shaped cultivator fingers mounted on said rotatable member and extending essentially radially outwardly from said head for respective pivotal movements about individual vertical axes; and control means mounted on each of said fingers and mechanically coupled to said stationary portion of said head for causing said fingers selectively to pivot about the individual vertical axes thereof so as to move in and out of said row in substantially perpendicular relationship with said row and without any material sidewise movement of said fingers, and for causing said fingers to move successively down into the soil surrounding said crop when said mechanism is moved along a path adjacent said row and essentially parallel thereto.

2. The mechanism defined in claim 1 in which said control means includes a cam follower mounted on each of said fingers and a cam member mounted on said head to be engaged by said cam follower so as to cause said fingers to rotate selectively about individual axes.

3. The mechanism defined in claim 2 in which said control means includes a first cam follower mounted on each of said fingers, a first cam member mounted on said stationary portion of said head and engaged by said first cam follower for causing each of said fingers selectively to pivot about said individual axes so as to move in and out of said row as head head rotates; a second cam follower mounted on each of said fingers, and a second cam member mounted on said stationary portion of said head and engaged by the second cam followers for causing said fingers successively to move down into the soil surrounding the crop.

4. A mechanism for cultivating a row of crops, including: at least one head having a stationary hub portion and a peripheral portion mounted for rotation about said hub portion and about an essentially vertical axis; drive means coupled to said head for producing rotation of said peripheral portion about said vertical axis when the mechanism is moved along a selected path; a plurality of hoe-shaped cultivator fingers mounted on said rotatable peripheral portion of said head for respective pivotal movement about individual vertical axes; first control means mounted on each of said fingers and mechanically coupled to said stationary hub portion for causing said fingers selectively to pivot about said individual axes so as to move in and out of said row in substantially perpendicular relationship therewith and without any material sidewise motion when said mechanism is moved along a path adjacent said row and essentially parallel thereto; and second control means mounted on each of said fingers and mechanically coupled to said stationary hub portion for causing said fingers successively to move down into the soil surrounding said crops as said fingers are moved in and out of said row.

5. The mechanism defined in claim 4 in which said first control means includes a cover mounted on said stationary hub portion and defining a cam surface, and a plurality of cam followers respectively mounted on said fingers and engaging said cam for causing said fingers selectively to pivot about said individual axes so as to move in and out of said row as said peripheral portion rotates.

6. The mechanism defined in claim 4 in which said second control means includes a cam member mounted on said stationary hub, and a plurality of cam followers respectively mounted on said fingers and engaging said cam member for causing said fingers successively to move down into the soil surrounding said crops as said fingers are moved in and out of said row.

References Cited

UNITED STATES PATENTS

| | | | |
|---|---|---|---|
| 107,639 | 9/1820 | Tranter | 172—93 X |
| 333,917 | 1/1886 | Brown | 172—111 |
| 1,284,075 | 11/1918 | Dwight | 172—97 |
| 1,294,346 | 2/1919 | Owens | 172—95 |
| 2,140,631 | 12/1938 | Johnston | 56—41 |
| 2,758,529 | 8/1956 | Hammitt et al. | 172—94 X |
| 2,764,922 | 10/1956 | Carnall et al. | 172—110 |
| 3,059,704 | 10/1962 | Kasatkin | 172—99 X |

ABRAHAM G. STONE, *Primary Examiner.*

R. L. HOLLISTER, F. B. HENRY, *Assistant Examiners.*